United States Patent [19]
DeFino et al.

[11] Patent Number: 4,481,574
[45] Date of Patent: Nov. 6, 1984

[54] PROGRAMMABLE INTERFACE BETWEEN REMOTE TERMINALS AND A COMPUTER

[75] Inventors: John M. DeFino, Burleson; Rufus Coomer, Fort Worth, both of Tex.; John W. Stannard, Los Gatos; Gary G. Voget, Cupertino, both of Calif.

[73] Assignee: Pinetree Systems, Inc., Grand Prairie, Tex.

[21] Appl. No.: 350,131

[22] Filed: Feb. 18, 1982

[51] Int. Cl.³ .............................................. G06F 3/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,507,997 | 4/1970 | Weitbrecht | 173/66 |
| 3,516,062 | 6/1970 | Spraker | 340/152 |
| 3,675,513 | 7/1972 | Flanagan et al. | 179/84 VF |
| 3,746,793 | 7/1973 | Sachs et al. | 179/2 DP |
| 3,746,794 | 7/1973 | Stifle et al. | 179/2 DP |
| 3,760,171 | 9/1973 | Wang et al. | 235/156 |
| 3,870,821 | 3/1975 | Steury | 179/2 DP |
| 3,896,267 | 7/1975 | Sachs et al. | 179/2 TV |
| 4,012,594 | 3/1977 | Paller | 179/2 DP |
| 4,012,599 | 3/1977 | Meyer | 179/84 VF |
| 4,193,112 | 3/1980 | Gilbert et al. | 364/200 |

OTHER PUBLICATIONS

Pinetree System, Inc., Model DP 2001 Data Prompter, pp. 1–4.

*Primary Examiner*—Raulfe B. Zache
*Attorney, Agent, or Firm*—Richards, Harris & Medlock

[57] ABSTRACT

A data receiver providing an intelligent interface for a hand held computerized data entry terminal to communicate over telephone lines with a host computer. The data receiver has multiple microprocessor control receiver line cards connected to telephone lines and interconnected to interface with the host computer. Each line card includes a system program in a nonvolatile area of memory and a customer application program in volatile area of memory. The data receiver answers the telephone, checks for errors and provides progress tones over the telephone line. When connected to a data entry terminal, the data receiver sets the baud rate, determines the line card protocol, reformats the data in accordance with the customer specifications and hands the data off to the host computer. A remote service computer may be connected to each line card to update the customer application program in the data receiver as well as perform diagnostic and testing routines over the telephone line.

7 Claims, 6 Drawing Figures

PROGRAMMABLE INTERFACE BETWEEN REMOTE TERMINALS AND A COMPUTER

TECHNICAL FIELD

This invention relates to a data receiver which receives data over telephone lines from a computerized data entry terminal, and more particularly to such a data receiver interfacing between the data entry terminal and a host computer.

BACKGROUND ART

The usefulness of computerized business information systems to management depends in large part upon the accurate and timely input of data. Field sales and service personnel for large companies often conduct their selling or service activities at diverse locations from the central office. Present practices for reporting and inputing remote sales or service data to a central data processing center involve collecting and recording the data manually and then forwarding it to the central office by mail, hand delivery, or by telephone. Upon receipt of the field data, it may be reviewed for errors, prepared and formatted for entry into the computer, and finally data is input to the computer by any one of several means, such as optical character recognition or direct entry by a keyboard operator. Such data collection systems have proven to be unsatisfactory in respect to the timely entry of accurate data to a central data processing system in a cost effective manner.

More recently, many companies have utilized portable hand held computerized data entry terminals for the entry and transmission of the data over ordinary telephone lines. Such a portable data entry terminal for a telecommunication system is disclosed in Applicant's copending U.S. patent application, Ser. No. 202,020, filed Oct. 28, 1980. Such computerized data entry terminals communicate with a data receiver interfacing between the data entry terminal and the host computer. The hand held computerized data entry terminal and data receiver form an improved telecommunications system for the recordal and entry of field data to a central data processing system. The format of the data entered into the data receiver may not be in the format desired for the record output from the data processing center. Any data receiver down time caused by scheduled or unscheduled service time disrupts the flow of business information to management and decreases the cost effectiveness of the system. A need has thus arisen for an improved data receiver with improved versatility for handling data, as well as improved reliability for testing, servicing, and reprogramming the data receiver.

SUMMARY OF THE INVENTION

In accordance with the present invention, a versatile telephone data receiver provides a totally intelligent interface between a hand held computerized data entry terminal and a host computer of a central data processing center. The data receiver has a motherboard which provides the generation of the clock signal, power supply, reset capability, and battery power backup. Individual computerized data entry terminals may be connected over one of the telephone lines coupled to one of the microprocessor controlled receiver line cards.

The microprocessor controlled line cards include memory means for storing the system's operational program, the customer application program, and a scratch pad area. The customer application is stored in a volatile memory area of the line card and is maintained in the event of power disruption by a battery backup included as part of the motherboard. The output data bus and control logic circuit are connected through the motherboard through an interface card, providing means for handing off the data to a host computer or printer. The hand off procedure can be any one of several methods such as RS 232, TTL parallel and TTL serial.

The data receiver line cards buffer one transmission from a data entry terminal and will hold the data until it is handed off to the host data processing system. The data receiver also acts as a multiplexer in that there are multiple input lines, four in one embodiment of the invention, and the receivers can also be stacked and plugged together to handle additional telephone lines simultaneously. Each of the telephone lines hands off one at a time to the host data processing system, and the multiplexing protocol is taken care of by the data receiver. The hand off of data from the line card to the host computer can be programmed to meet the customers needs. The hand off may include a single character to indicate that the system is reading the line and an additional one or two characters to indicate whether or not the data was good or a retransmission of the data is requested. The hand off procedure can also be as complex as allowing the receiver to log onto the host data processing system, giving account passwords and calling up a specific program in handing off the data to that program.

The firmware controls the operation of the system and is loaded into an EPROM as the storage area. The firmware contains the programs for initializing the data receiver, answering the telephone lines, test and receive incoming data, set the baud rate to that of the incoming data, as well as subroutines for the record data from a computerized data entry terminal or command data from a remote update service computer.

In accordance with one aspect of the invention, the commands from the remote update service computer enable the remote testing, diagnosing and reprogramming of the data receiver. The actual customer application program is stored in a volatile memory area. The customer application program may be accessed by a remote service computer over ordinary telephone lines. The customer application program may be downloaded over the telephone lines to the data receiver by the service computer for remote diagnostic and testing requirements. The customer application program can be reprogrammed as necessary and sent from the remote service computer over the telephone lines to the memory area of a line card of the data receiver.

In accordance with another aspect of the invention, the data receiver maintains a performance log by storing certain counts in memory related in performance of the system, such as the number of phone calls, the number of times data is acknowledged as received, the number of times error occurred in transmission, the number of times data was logged, or the number of time there was a bad handoff of data between the data receiver and the host computer. The performance log may be monitored at predetermined intervals by the remote service computer.

In accordance with another aspect of the invention, the data transmitted from a remote data entry terminal is reformatted into the customer record data. The customer record data can be formatted for handoff to a host computer or formatted to hand the data off directly to a printer to appear as a printed report.

In accordance with another aspect of the invention, the data receiver internally multiplexes the multiple microprocessor controlled receiver line cards. In the embodiment of the invention disclosed, the data receiver includes four inputs and a single output to either a computer or printer. The control logic circuitry for each receiver line card requires a handshake signal from the motherboard indicating the output line is clear before the line card can set the latch for the output data bus.

BRIEF DESCRIPTION OF THE DRAWINGS

A more complete understanding of the present invention and its advantages will be apparent from the following Detailed Description taken in conjunction with the accompanying Drawings in which.

DETAILED DESCRIPTION

Figure 1:
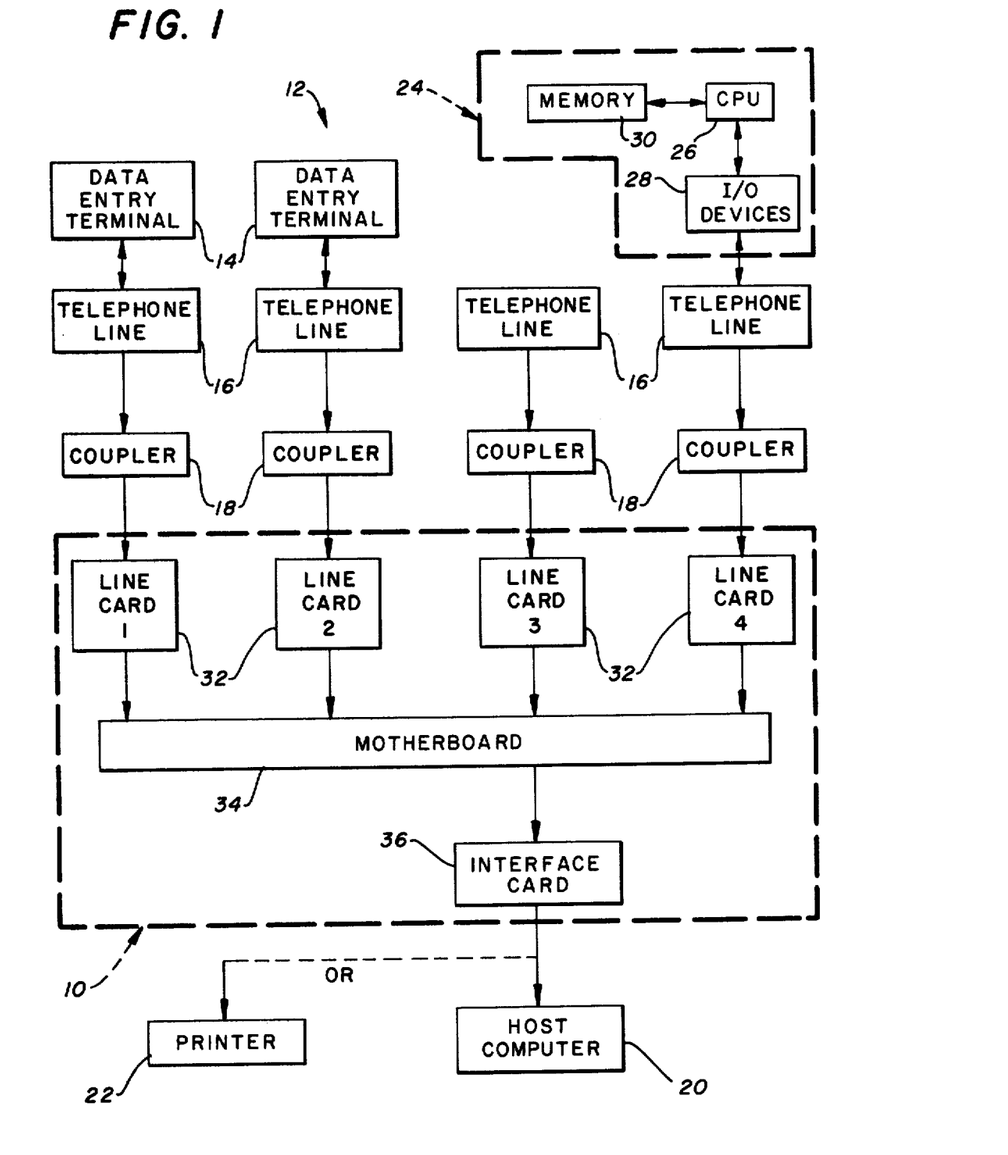
FIG. 1 is a block diagram view of a telecommunications system utilizing the data receiver of the present invention.

FIG. 1 illustrates a remote programmable data receiver of the present invention, generally identified by the reference numeral 10, forming part of a telecommunications system 12. In addition to the programmable data receiver 10, the telecommunications system 12 includes one or more computerized data entry terminals 14 that may access the data receiver 10 over telephone lines 16 through couplers 18. The single output from the data receiver 10 may be input to a host computer 20 or a printer 22 or other suitable display means of a centralized data processing system. The programmable data receiver 10 is also accessible over the telephone lines 16 by a remote service computer 24 for accessing the programmable data receiver 10. The service computer 24 includes a central processing unit 26, input/output devices 28 as well as a memory unit 30.

The inputs from the data entry terminals 14 are input over telephone line 16 and a coupler 18 to the data receiver 10 through individual microprocessor controlled line cards 32. The multiple line cards 32 are interconnected through a motherboard 34 which provides the clock signal, power supply, and reset to the line cards 32. The motherboard 34 also provides a battery power backup to the line cards 32. The single output from the motherboard 34 is interconnected to the host computer 20 and/or printer 22 through an interface card 36. The properly formatted data from the line cards 32 is handed off by the interface card 36 by any one of several methods, such as RS 232 (an asynchronous serial output method), TTL parallel or TTL serial.

Figure 2:
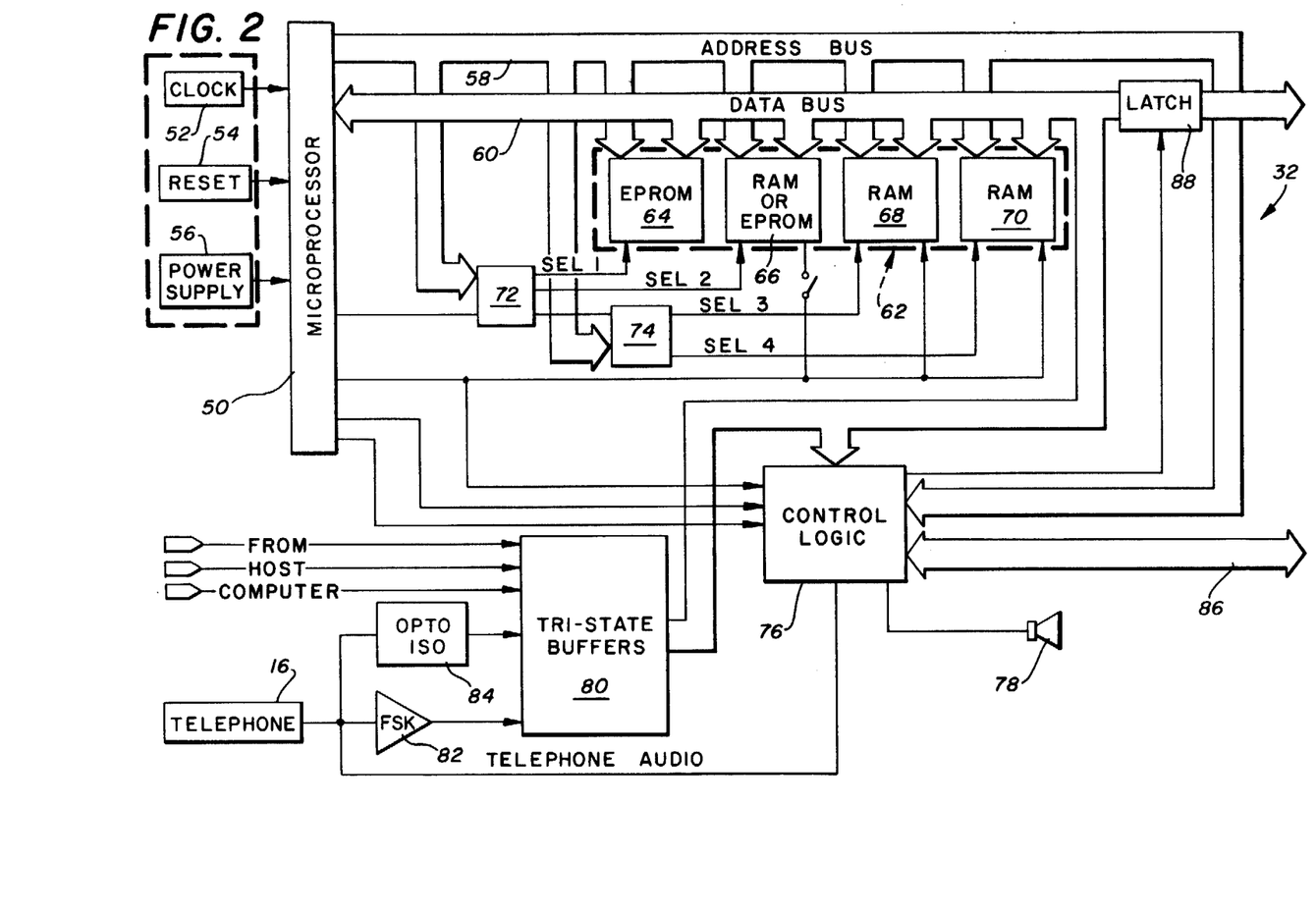
FIG. 2 is a block diagram of a receiver line card of the data receiver illustrated in FIG. 1.

FIG. 2 illustrates one of the individual microprocessor controlled receiver line cards 32, including the functions provided by the motherboard 34. Each receiver line card 32 has a microprocessor 50. The microprocessor 50 has its clock signal 52, reset function 54 and power supply 56 derived from the motherboard 34. A Z-80 microprocessor manufactured by Zilog, Inc. may be used as the microprocessor 50.

The microprocessor 50 is connected through an address bus 58 and data bus 60 to the line card memory area 62 and the data bus of the motherboard 34. The line card memory illustrated includes firmware memory chip 64, a customer application memory chip 66, additional scratch pad memory chips 68 and 70 which are used in the storage of incoming data and reformatting the data. In the line receiver card 32 illustrated in FIG. 2, the firmware memory chip 64 is a 4K by 8 bit EPROM. The customer application memory chip 66 is normally a RAM device to provide a volatile memory means for the reprogrammable customer application program. Battery power backup for the volatile memory is provided from the motherboard 34. The customer application program chip 66 may also be a nonvolatile memory device, such as an EPROM, if the customer selects a hard coded application program. The scratch pad chips 68 and 70 are volatile memory devices for the storing incoming data and storage requirements for reformatting the data. The microprocessor 50 selects either memory chip 64 or 66 over the address bus 58 through an address decode and selection chip 72. Similarly, the microprocessor 50 accesses either of the scratch pad memory devices 68 or 70 through address bus 50 and address decode and select chip 74.

A control logic block 76 represents a series of semiconductor chips for controlling the part of the line receiver card 32 to be accessed. The control logic 76 may access some part of the line card memory area 62 or accessing some part of the input/output signals to the line card 32. The output selected could be the output to the audio annunciator 78 or the telephone audio output to the telephone line 16. The audio annunciator 78 provides an audible signal in the customer's office, and the telephone audio output signal to the telephone line may be an audio tone to the data terminal input 14, e.g., a disconnect or connect tone, an error tone, or some progress tone. The control logic 76 also controls line card 32 in response to the microprocessor 50 read request, write request or input/output request signals. The tristate buffers 80 is an input buffer area to the line card 32. The tristate buffers 80 receive input from the host computer 20 over three lines from the interface card 36: a receive and transmit line, an auxiliary receive and transmit line, and a handshake line. The auxiliary receive and transmit line provides a redundancy to prevent the multiple line cards 32 from being blocked off from the host computer 20 by the failure of the primary receive and transmit line. The tristate buffers 80 also receive input from the FSK circuitry 82 for decoding the data input signals of the telephone line 16, and an opto isolater 84 that detects a ringing signal from the telephone line 16. The control logic circuitry 76 also provides a handshake signal 86 for handing off data to and from the motherboard 34, and an input/output write signal to a latch 88. The latch 88 seizes the data bus to the motherboard data bus, and the other line cards 32 will not seize the data bus until the handshake signal 86 is provided which shows it is free to communicate with the motherboard 34. The control logic 76 may also control the illumination of one of a plurality of LED'S (not illustrated) to indicate which line cards 32 are busy.

Figure 3A:
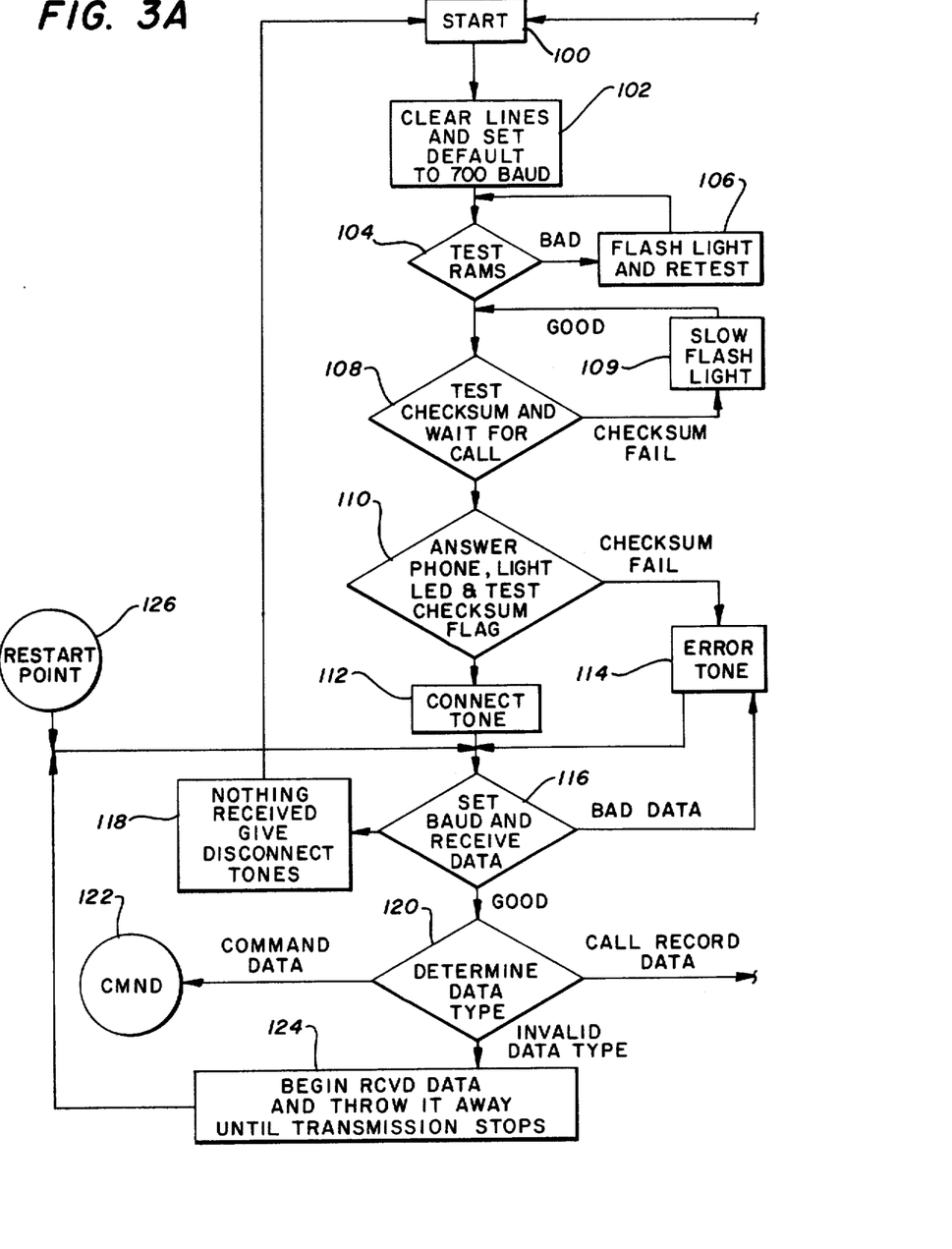
FIGS. 3A-B is a program operation flow chart of the data receiver.
Figure 3B:
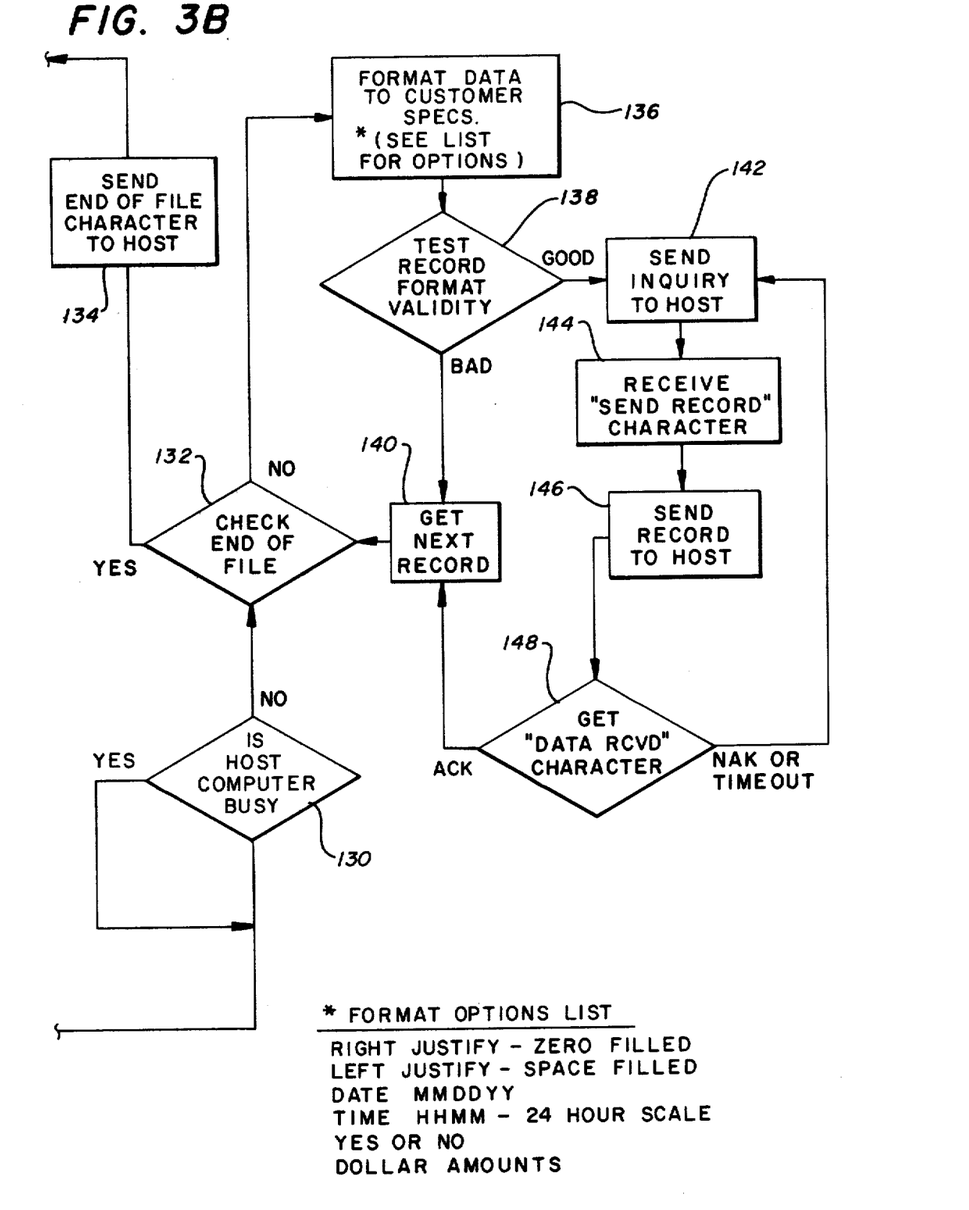
Figure 4A:
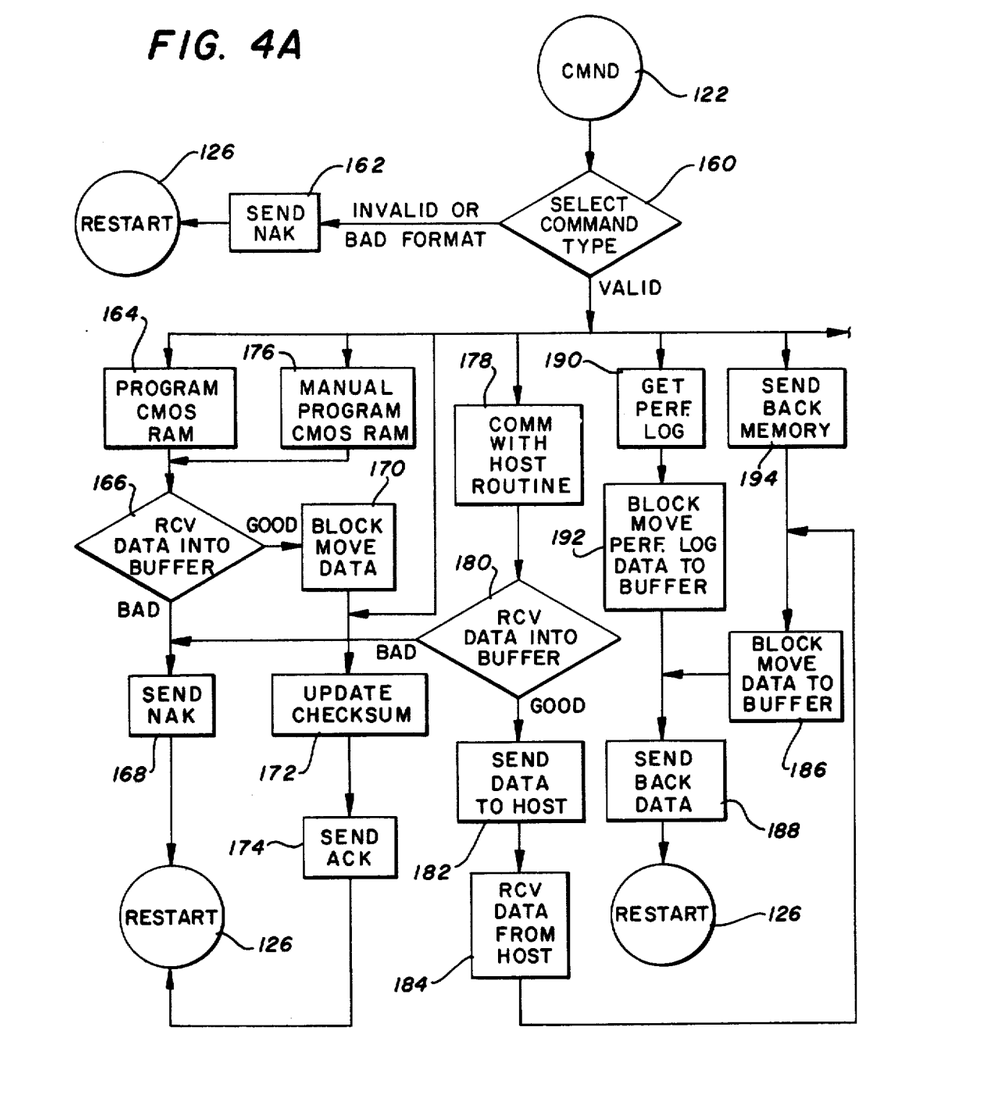
FIGS. 4A-B is a flow chart of the command data routine of the program operation flow chart of the data receiver.
Figure 4B:
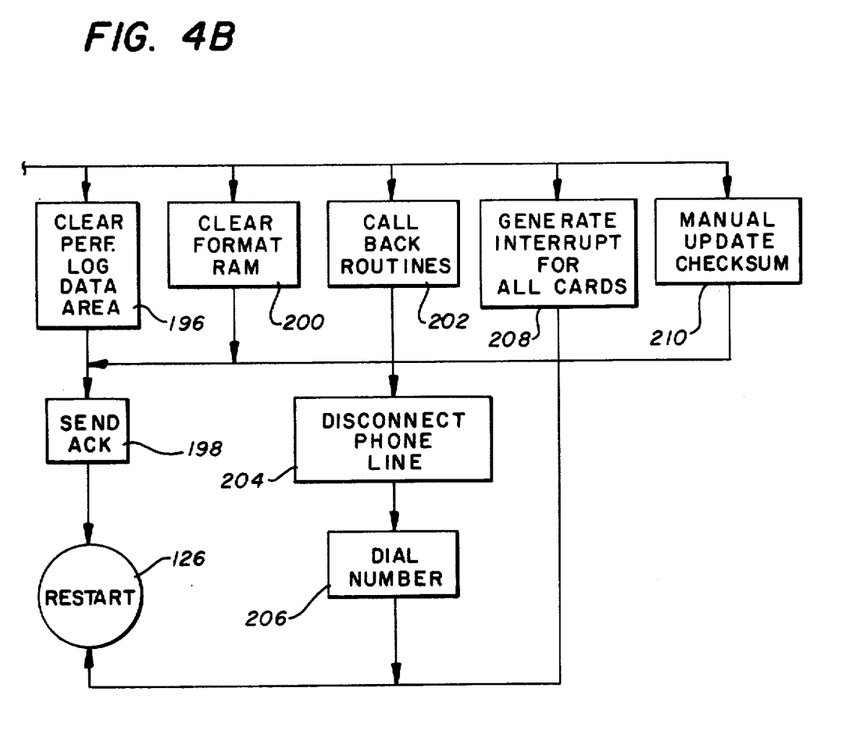

FIGS. 3 and 4 illustrate the program operational flowchart for the data receiver 10 of the present invention stored in the EPROM 64. A starting instruction 100 begins the initialization subroutine for the data receiver 10. The subroutine advances to instruction 102 to clear the lines and set the default to 700 baud for the rate at which data is received, but the data receiver 10 could be defaulted to 350 baud to initialize the system. The 700 baud transmission rate is preferred, but the 350 baud rate may be necessary over certain degraded telephone lines. The program then advances to step 104 to test the RAMs, both the RAM 66 for the application program and the scratch pad RAMs 68 and 70. If the test 104 test indicates the RAMs are bad, the routine advances to step 106 to flash a light on the data receiver 10 and return to test 104 to retest the RAMs. The program then advances to test 108 to test the CHECKSUM and wait for a call. If the CHECKSUM fails, the routine branches to step 109 to slowly flash a light and returns to the test 108. The CHECKSUM is two bytes of data indicating the running sum or total plus a vertical parity check of the instructions of the customer application program. The system then advances to inquiry 110 to answer the phone line, light the LED on the data receiver 10 and test to see if the CHECKSUM flag was set. If the CHECKSUM test flag is set, indicating the customer application program in EPROM 64 tested out satisfactorily, a connect tone 112 will be given. If the CHECKSUM flag has not been set, an error tone 114 will be given so the data receiver 10 may be connected to the remote service computer 24.

The program then advances to step 116 to set the baud rate based upon the first character received as well as to check the received data. The first character indicates whether the transmission rate will be 350 or 700 baud and a flag is set to indicate the transmission rate. If the test 116 determines that the data is bad it returns to a block 114 to generate an error tone. If the received data check indicates nothing is received it branches to an instruction 118 to give a disconnect tone and return the program to start block 100. If the receive data check indicates that the data is good and the program advances to inquiry 120 to determine the data type. Data receiver 10 may receive either command data which causes the system to branch to the "CMND" subroutine 122 or call record data. If the inquiry 120 determines if the data is an invalid type, it advances to an instruction 124 disregards the invalid data until the transmission stops and then returns to restart point 126.

The call record data subroutine is activated when a data entry terminal 14 has transmitted data to the data receiver 10, and the receiver 10 is trying to access the host computer 20 to transmit the data received and buffered in its RAMs 68 and 70. A first inquiry step 130 determines if the host computer 20 is busy. If the host computer 20 is busy, it branches back to inquiry block 130 to retest until the host computer is not busy. When the host computer 20 is not busy, the subroutine enters inquiry block 132 to check if the received data is the end of the file. If it is the end of the file, the call record data subroutine branches back to 134 to send an end of file character to the host. If the inquiry 132 indicates that the received data is not the end of the file, the subroutine enters block 136 to format the data to the customer specifications. The customer specifications may include right justify, left justify, date (month, day and year) the time (24 hour scale), "yes or no" indicated and dollar amounts. The specific format options represent subroutines which are called up by the customer application program. An inquiry step 138 tests data record to see if the format is valid. If the record format is invalid the routine branches to step 140 to get the next record in line and returns to inquiry 132 to check to see if the next record is the end of the file. If the record format is valid, the routine then enters block 142 to send an inquiry character to the host computer 20. The inquiry character may differ for each host computer 20. The data receiver 10 then receives an instruction 144 which is the "send record" character from the host computer 20. The subroutine then executes instruction block 146 to send the data record to the host computer 20. An inquiry 148 is then made to see the data receiver 10 gets a "data received" character from the host computer 20. If it does not receive a data received character, the routine branches back to step 142 to repeat the steps to hand off data to the host computer 20. If the inquiry 148 indicates that data has been received, an acknowledge signal ("ACK") will cause the subroutine to return to get the next record step 140.

The command subroutine 122 is illustrated in FIGS. 4A–B and includes the commands from the remote update service computer 24 to the data receiver 10. An initial check 160 is made to determine the validity of the command type. If the command type is invalid or is in the incorrect format, the routine branches to instruction 162 to send a not acknowledge ("NAK") signal and returns to restart 126 (FIG. 3A). If the command selected is valid the command subroutine 122 advances to one of the ten commands.

A program CMOS RAM command 164 enables the remote update service computer 24 to send a complete file to the customer application program in memory chip 66 (FIG. 2). The routine then advances to inquiry 166 to determine if the data is received into the buffer. If it is not, a not acknowledge signal 168 is transmitted and the subroutine returns to restart 126 (FIG. 3A). If the data is received into the buffer, the program advances to step 172 to move the block of data. The information in the CHECKSUM is updated at step 172 to reflect the new program data. Finally, an acknowledge signal 174 is sent to the remote update service computer and the subroutine is returned to restart 126.

A manual program step 176 enables the operator of the remote update service computer to type in byte by byte the program modification. The manual program CMOS RAM step 176 then advances to step 166 to check the received data in the buffer. The program then advances to step 170 to move the block of data and update the CHECKSUM in step 172. The manual program step 176 enables a particular change to be made without downloading the entire program, as in program CMOS RAM 164.

The communication with host subroutine 178 is a command which enables the data receiver 10 to act as a modem for communication directly between the remote update service computer 24 and the host computer 20. Following the command 178, the routine advances to inquiry 180 to receive the data into a buffer and determine the validity of the data. If the data is bad, the subroutine branches to the send not acknowledge signal 168. If the receive data is valid, the subroutine executes step 182 to send the data from the remote update service computer 24 to the host computer 20. The program then executes instruction 184 to receive data from the host computer 20 and advances to block 186 to move the block of data to a buffer. The subroutine then enters an instruction 188 to send the data back to the remote update service computer 24 and returns to restart 126.

An operator may select the get performance log instruction 160 to obtain a record of the performance of the data receiver 10. An example of the type of performance log record maintained by the data receiver 10 is as follows:

| Performance Log Record | |
|---|---|
| Code Level | ———— |
| Reserved | ———— |
| Telephone Calls | ———— |
| Calls Acknowledged | ———— |
| Received Errors | ———— |
| Transmit Breaks | ———— |
| Records Formatted | ———— |
| Record Handoffs | ———— |
| Host COMM Attempts | ———— |
| Bad Record Handoffs | ———— |
| Record Data Errors | ———— |

The command subroutine advances to an instruction 192 to move the performance log data to a buffer, and the routine then executes instruction 188 to send the data back to the remote service computer 24 and returns to restart 126.

An instruction 194 enables the remote service computer to command data receiver 10 to send back its memory, which is a memory dump of portions of the computer application program in RAM 66 or the contents of the scratch pad memory in RAMs 68 and 70. The routine then advances to instruction 186 to move the block of data to the buffer and then to instruction 188 to send the data back to the host computer.

An instruction 196 clears the performance log data area of the data receiver 10, which zeros this data area normally following a command 190 to get the performance log. The performance log is the count of data receiver activity maintained in a dedicated area of the customer application program RAM 66. After clearing the performance log data area, an instruction 198 is sent to acknowledge execution of the instruction. The routine is returned to restart 126.

An instruction 200 clears the format RAMs 68 and 70, which may be useful in diagnostic purposes. Execution of the instruction 200 is acknowledge by send acknowledge signal 198 and a return to restart 126.

A command 202 call back routine is an instruction to the data receiver 10 to call up the remote update service computer 24. Subroutine first disconnects a phone line 204 and advances to step 206 to dial the telephone number to reach the remote update service computer. The call back routines command 202 may be executed by command from the customer application program on the occurrence of a particular error in the data receiver 10. The ability of the customer application program to automatically dial up the remote update service computer 24 enables the diagnosis and reprogramming of the data receiver 10 to be made without constant monitoring of the data receiver 10.

An instruction 208 generates an interrupt for all cards. It is an emergency instruction from the remote update service computer 24, e.g., one of the four receiver line cards 32 may get hung in a loop which would require an execution of the instruction 208 to generate an interrupt for all line cards 32.

A manual update CHECKSUM instruction 210 enables the remote service computer 24 to manually change the information in the block for the CHECKSUM to reflect manual program changes in the customer application program.

In operation, the data receiver 10 may be accessed over any one of its telephone lines by the remote service computer 24 or one or more of the data entry terminals 14. The data receiver 10 serves as an intelligent interface between the telephone line 16 and a host computer 20 or printer 22. When powered on, the data receiver 10 initializes itself by clearing all lines and defaulting the baud rate to an arbitrary value of 700. The computer application program RAM 66 and scratch pad RAMs 68 and 70 are tested to determine if they are operating properly. If they are not operating properly, a warning light is flashed in the customer's central data processing center to alert him of the problem. As part of the initialization routine, the data receiver 10 will also test the CHECKSUM value for the computer application program and stand by in a ready condition to receive a call.

The data receiver 10 answers the telephone line, lighting an LED display for the line on which the call is received. The CHECKSUM flag is retested. If there is an error an error tone is generated over the telephone line to alert the caller of the error. If the CHECKSUM flag has been properly set, indicating the customer application program CHECKSUM information block contains the correct information, a connect tone is sent over the telephone lines to the caller. The first character transmitted contains information on the baud rate for the transmission. Normally 700 baud would be the transmission rate, but 350 baud may be utilized over degraded telephone lines. A check is made on the received data again, and an error tone is generated over the telephone line if bad data has been received. If the data received is verified, then an acknowledge tone is sent over the telephone line. The data receiver 10 will then determine if the transmission is from a data entry terminal 14 or from a remote service computer 24. If the transmission is from a portable data entry terminal 14, the operational program will call up the CALL RECORD DATA subroutine. If the communication is from the remote service computer 24, the operational program will call up the COMMAND DATA subroutine.

If the communication is from a portable computerized data entry terminal 14, the data receiver 10 will first determine if the output line to the host computer is busy. In the present embodiment there are four line cards and one output for the data receiver 10, but of course any number of line cards may be used. The data receiver program then formats the data to the specific customer specifications. As an example of the format options available, it may include subroutines for right justification (zero filled), left justification (space filled), date (displayed by month, day and year), time (display 24 hour scale by hours and minutes), a "yes" or "no" response, and the dollar amount. The program modules for these format options is called for by the interaction with the customer application program. The file record data is then handed off to the host computer 20, and a data received character is returned to indicate the information has been received by the computer. More complex data handoff procedures can be used, such as actually logging onto the host computer 20, giving account passwords, calling up a specific program and handing off a data to that program. More than one specific program could be called up in the host computer. For example, if a customer has call data or parts data in its hand held data entry terminal 4, when the data receiver 10 picks up this information it will check for the data type. If it is parts information it will call up the parts program and hand the data off there. If it is call report information, it will call up that program and hand the data off to that specific program in the host computer.

If the data receiver 10 determines that the type of data is a command instruction, it will branch to the command subroutine for instructions from the remote update service computer 24. After checking for a valid command type, the data receiver 10 may be issued a command to program the CMOS RAM by filling the RAM with a revised or updated program. The updated program is block checked and updated for the CHECKSUM and an acknowledged signal is returned to the programmer over the telephone at the other end of the remote update service computer 24. In addition to reprogramming the complete customer application program, a command may be issued to manually change one byte of the program. This change also includes block checking the data and updating the CHECKSUM prior to forwarding an acknowledge signal back to the remote service computer 24.

The data receiver 10 may also be issued a command from the remote computer 24 to enable it to act as a modem for direct communication with the host computer 20. The received data from the update computer 24 is buffered and sent to the host computer. The returned data from the host computer 20 is blocked and turned back to the remote update service computer 24.

The volatile area of memory for the customer application program includes an area dedicated for maintaining the performance log. An example of the type of information that might be recorded on the performance log is described hereinabove in connection with FIG. 4A. The performance log may be remotely monitored by accessing the data receiver 10 over the telephone line 16 with the remote service computer 24. The performance log data is buffered and returned to the computer 24 where it may appear on an output display screen of an input/output device 28 of the computer 24. Following a reading or monitoring of the performance log, an instruction may be given to clear the performance log data area, zeroing this account for initiating a new performance log.

The data receiver 10 may also be instructed by the remote service computer 24 to call it back upon detecting a specific error problem in the customer application program. When that error occurs in the customer application program, the data receiver 10 automatically calls the remote service computer 24 and generates some type of an alarm signal in the remote service office to alert the operator of a requested service call. The data receiver automatically disconnects the phone line and dials the number of the remote service computer.

While the data receiver 10 of the present invention has been described in detail herein, it will be understood that various and further modifications are possible without departing from the scope and spirit of the present invention.

We claim:

1. A programmable data receiver for interfacing between remote terminals and a host data terminal, comprising:

means for receiving data transmitted over telephone lines to the data receiver from the remote terminals;

means for identifying call record data from a remote data entry terminal;

means of identifying command data from a remote service computer terminal;

electronic digital signal processing means for processing received data;

non-volatile memory means for storing program instructions for said electronic digital signal processing means;

volatile memory means for storing customer application program instructions for processing the received data by said electronic signal processing means;

random access memory means;

means for receiving and storing customer application program instructions in said random access memory means responsive to command data from the remote service computer terminal;

means for moving the customer application program instructions from said random access memory to said non-volatile memory area to revise the customer application program instructions;

control logic circuit means responsive to said electronic digital signal processing means for controlling the transfer of data in and out of the data receiver; and means for transferring received data from the data receiver to a host data terminal.

2. The data receiver of claim 1, wherein said host data terminal is a computer.

3. The data receiver of claim 1, wherein said host data terminal is a printer.

4. The data receiver of claim 1 and further comprising:

means for reformatting the received data into a predetermined record output format, whereby data received from a data entry terminal is reformatted to a predetermined customer record format prior to transfer.

5. The data receiver of claim 1 further comprising:

means for counting the occurrences of predetermined data receiver operations; and means for storing such count of predetermined data receiver operations in said non-volatile memory area, whereby the accumulated count of the data receiver operations is a record of the performance of the data receiver.

6. The data receiver of claim 5 further comprising:

means for transmitting said stored count of predetermined data receiver operations to the remote service computer responsive to command data from the service computer, whereby the performance of the data receiver may be remotely monitored by the service computer.

7. The programmable data receiver of claim 1 and further comprising:

means for generating an error signal in response to a predetermined error occurring in the customer application program;

means for connecting the data receiver to the remote service computer terminal in response to said error signal; and means for transmitting said error signal to the service computer terminal, whereby a predetermined error in the customer application program may be detected for correction.

* * * * *

UNITED STATES PATENT AND TRADEMARK OFFICE
CERTIFICATE OF CORRECTION

PATENT NO. : 4,481,574

DATED : November 6, 1984

INVENTOR(S) : John M. DeFino, Rufus Coomer, John W. Stannard
Gary G. Voget

It is certified that error appears in the above-identified patent and that said Letters Patent is hereby corrected as shown below:

Column 9, line 7, change "4" to --14--.

Signed and Sealed this

Twenty-third Day of April 1985

[SEAL]

Attest:

DONALD J. QUIGG

*Attesting Officer*  *Acting Commissioner of Patents and Trademarks*